H. E. HERBERT & J. B. HOGEBOOM.
SPRAYING IMPLEMENT.
APPLICATION FILED OCT. 13, 1917.
1,276,653.
Patented Aug. 20, 1918.
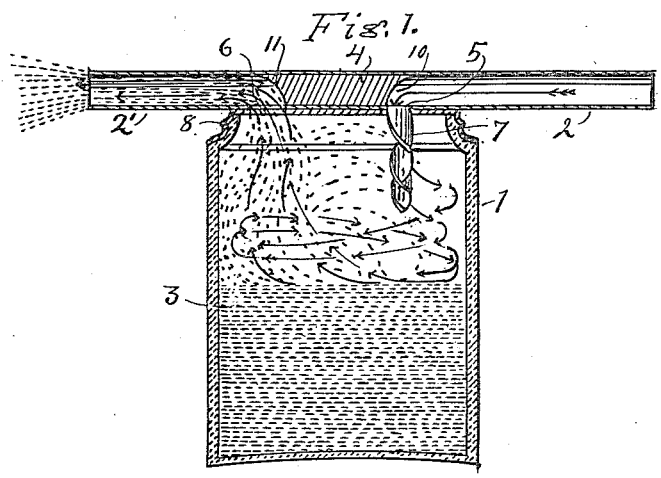
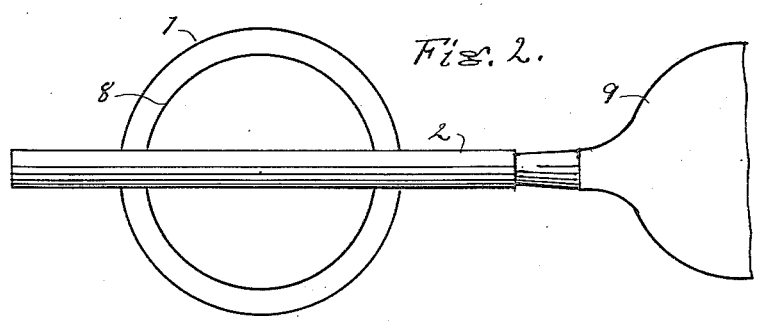
Inventor
Henry E. Herbert
James B. Hogeboom
By Ithiel J. Cilley
Attorney

UNITED STATES PATENT OFFICE.

HENRY EDWARD HERBERT AND JAMES BERT HOGEBOOM, OF MARTIN, MICHIGAN.

SPRAYING IMPLEMENT.

1,276,653.   Specification of Letters Patent.   Patented Aug. 20, 1918.

Application filed October 13, 1917. Serial No. 196,522.

*To all whom it may concern:*

Be it known that we, HENRY E. HERBERT and JAMES B. HOGEBOOM, citizens of the United States, residing at Martin, in the county of Allegan and State of Michigan, have invented certain new and useful Improvements in Spraying Implements, of which the following is a specification.

Our invention relates to improvements in devices designed for spraying very fine powder, as arsenate of lead, Paris green, and kindred insecticides upon plants for the purpose of destroying, and driving off insects, and its objects are: first, to provide a means whereby the inflowing current of wind or air will be made to assume a whirling motion inside of the powder receptacle, or container, whereby the powder will be agitated to the greatest possible degree inside the container to produce the best possible results and an even, abundant flow of powder from the spraying implement, and, second, to so construct the air conducting pipe that the air will have as nearly a direct flow from the pipe into the container, and from the container into and through the discharge end of the pipe as possible.

We attain these objects by the construction shown in the accompanying drawing, in which Figure 1 is a vertical section of the container and air pipe showing how the two are connected, and the appliance for giving the inflowing air a whirling movement in the container, and Fig. 2 is a plan of the container and pipe with an air injector indicated.

Similar numerals refer to similar parts in both views of the drawing.

In the construction of this implement, an ordinary glass fruit jar may be utilized, as indicated at 1 in Fig. 1, and the air pipe 2 is securely attached to the cover 8 and has an opening 5 at one end for the ingress of air, and a similar opening 6 near the other end for the outward passage of the air and powder. We place a dam, or obstruction 4 in the pipe 2 between the openings 5 and 6, and prefer that the ends of this dam be made upon a curve, as indicated at 10 and 11, so as to allow a free flow of the air, both into the receptacle or container 1, and out of the container through the outflow end 2' of the pipe, all as indicated in Fig. 1.

To give the inflowing air the proper whirl inside of the container, we place a screw shaped, or corkscrew shaped discharge in the receptacle cover directly at right angles with the inner surface of the cover 8, and with the air pipe 2, so located and arranged that when the air is forced through the opening 5 it will engage the discharge plate, or distributer, in such a manner that when escaping from it the air will leave the distributer 7 practically upon the circle of the inner wall of the receptacle, and will be forced rapidly around the said wall, forming a miniature whirlwind within the container which tends to loosen the powder at the surface of powder 3, as indicated by the several arrows within the container, thus always keeping the powder thoroughly agitated within the container, instead of packing the surface of the powder so firmly as to render it almost impossible to discharge any available amount of powder from 2', as in the case where the inflowing air is left to come in direct contact with the upper surface of the powder 3.

In Fig. 2 we have shown, at 9, an indication of an air injector connected with the inflow end, 2, of the air pipe, which may be a bulb, a bellows, a piston working in the pipe, or any other available form of forcible injector.

While it is desirable to place the outflow opening, 6 as near to the rim of the container cover 8 as possible, for the purpose of making the outflow as free as possible, the inflow plate or guide 7 should be much nearer the center of the container, and it is well to make the outflow larger than the inflow opening so there will be no danger of choking the opening to the outflow pipe 2' with an overabundance of powder, as the outflow of powder with our implement is much more abundant than with ordinary sprayers.

The distributer or guide 7 is made of sheet metal, and is so twisted that the air must escape from the side, and with a very strong whirling movement.

What we claim as new, and desire to secure by Letters Patent of the United States, is:

1. In combination with a powder container and its cover, a pipe secured across the top of the cover and having an inflow opening and an outflow opening through the pipe and cover into the container, a dam in the pipe between the two openings, the ends of the dam formed upon a curve back of, and over the openings, and a screw formed sheet metal air distributer projecting downwardly at right angles from the pipe below the inflow opening.

2. In combination with a powder container and its cover, an air pipe secured across the top of the cover and having an inflow opening and an outflow opening in direct alinement, a dam located midway of the pipe, the pipe having an opening into the container at one side of the dam, and an opening out of the container at the other side of the dam, and means connected with the pipe at the opening into the container to cause inflowing air to engage the surface of the powder with a whirling movement.

Signed at Martin, Michigan, October 1st, 1917.

HENRY EDWARD HERBERT.
JAMES BERT HOGEBOOM.